United States Patent [19]

Buckley

[11] 4,350,233

[45] Sep. 21, 1982

[54] STRUCTURAL DAMPER FOR ELIMINATING WIND INDUCED VIBRATIONS

[75] Inventor: William H. Buckley, Rockville, Md.

[73] Assignee: The United States of America as represented by the Secretary of the Navy, Washington, D.C.

[21] Appl. No.: 192,671

[22] Filed: Oct. 1, 1980

[51] Int. Cl.$^3$ ............................................. F16F 7/10
[52] U.S. Cl. .................................. 188/378; 188/268; 267/140.1
[58] Field of Search ............... 188/378, 379, 380, 381, 188/371, 268, 372, 382; 52/720; 174/42; 267/152, 140.1, 140.3, 140.4, 141.1–141.7

[56] References Cited

U.S. PATENT DOCUMENTS

| | | | |
|---|---|---|---|
| 2,724,588 | 11/1955 | Sheets | 267/141.1 X |
| 3,259,212 | 7/1966 | Nishioka et al. | 188/378 |
| 3,382,629 | 5/1968 | Reutlinger | 52/720 X |
| 3,568,805 | 3/1971 | Reed | 188/378 |
| 4,130,185 | 12/1978 | Densmore | 188/378 |

Primary Examiner—Douglas C. Butler
Attorney, Agent, or Firm—R. F. Beers; L. A. Marsh

[57] ABSTRACT

A damping assembly for reducing wind-induced vibrations in elongated structures comprises a plurality of damping tubes suspended within the structure in end-to-end relationship so that the end portions of the damping tubes are disposed in abutting relationship with the inner surface of the structure. Each damping tube includes an elongated shell, vibration damping material such as sand filling the shell, and plug elements sealing the end portions of the shell. Rod elements are secured to the plugs to interconnect the damping tubes. In an alternative arrangement spacer elements are connected to the rods so that the damping tubes are supported at their end portions in an aligned relationship.

11 Claims, 7 Drawing Figures

STRUCTURAL DAMPER FOR ELIMINATING WIND INDUCED VIBRATIONS

BACKGROUND OF THE INVENTION

This invention generally relates to vibration damping means and more particularly to damping mechanisms for reducing wind induced oscillations and vibrations of tall, slender structures such as lightpoles, flagpoles, antennas and the like.

Modal vibrations of tubular poles and similar structures positioned in an ambient wind field can occur and cause undesirable noise and mechanical failure of the structure and the supports therefore. For example, such vibrations frequently result in fatigue failure of the pole or failure of fittings and couplings which attach the pole to a supporting structure. In slender structures such as antennas, lightpoles and flagpoles the vibrations are primarily induced by vortex shedding of the wind flow around the structure, which cause the structure to oscillate generally transverse to the wind direction. As the wind passes around an elongated structure small vortices are shed from the primary wind flow path and, for cylindrical structures, the vortex shedding assumes a regular alternating pattern with vortices shed first from one side and then the other side of the flow path. In the vicinity of the shedding the flow behavior generates an alternating force on the cylinder lateral to the relative direction of wind flow. These oscillations become self-excited when the frequency of the wind induced oscillations reaches one of the resonant modal frequencies of the cylindrical structure.

The frequency of vortex shedding for a fixed cylinder has been found empirically to be related to the Strouhal Number as follows:

$$S = fd/v \text{ or } f = Sv/d$$

where
 $S$ = Strouhal Number
 $f$ = frequency of vortex shedding (sec-1)
 $d$ = diameter of the cylinder (ft.)
 $v$ = wind velocity (ft./sec.)

Where laminar flow exists around a cylinder, S has been found to be equal to about 0.2 with most of the excitation energy concentrated at a single frequency. Upon transition of the air flow in the boundary layer from laminar to turbulent flow near the shoulder of the cylinder, experimental tests have shown that the Strouhal Number drops to about 0.12. However, as the turbulent flow increases, wherein for example $RN = 6346Vd$, the energy spectrum becomes increasingly broad-banded so that a significant amount of energy is again evident at a Strouhal Number of about 0.2. Thus, the frequency of vortex shedding (f) is primarily affected by the wind velocity.

The vortex shedding force acting on an elongated structure for a particular wind speed can thus excite a resonant modal response in the structure which results in large amplitudes of self-excited structural vibrations. These self-excited vibrations normally occur when the vortex shedding frequency is substantially coincident with one of the modal frequencies of the structure. Also, due to a phenomena known as "lock on", the structure can be caused to vibrate at a modal frequency by a range of wind speeds and accompanying vortex shedding frequencies which are approximately equal to the modal frequency of the structure. Therefore, since the structure vibrates only at well defined modal frequencies for broad ranges of vortex shedding frequencies, the elongated structure can be efficiently dampened by providing damping elements which have primary resonance frequencies which are substantially equal to the modal frequencies of the structure.

Numerous prior approaches taken to overcome wind induced vibrations of pole structures have been met with varying degrees of success. For example, cables and guy wires have been attached to the poles at the points of maximum deflection for limiting the extent of such deflections. In other circumstances, damping devices have been attached to the pole structures for reducing the magnitude of the wind induced oscillations. One type of damping device which employs a viscous liquid damping means is generally disclosed in U.S. Pat. Nos. 3,245,177; 3,266,600; 3,310,138; and 3,382,629. Another type of damping device which utilizes shear and friction generated within an arrangement of alternating stiff plates and viscoelastic materials to dissipate vibrational movements of a structure is generally disclosed in U.S. Pat. Nos. 3,159,249; 3,174,589; and 3,314,502. Other types of damping devices are disclosed in U.S. Pat. Nos. 3,568,805; 3,612,222; and 3,826,340.

SUMMARY OF THE INVENTION

The present invention is designed to overcome drawbacks experienced with the prior art by providing a means for reducing and suppressing wind induced oscillations in elongated structures which are susceptible to periodic vortex shedding, such as antennas, flagpoles and lightpoles. This is generally accomplished by supporting a plurality of damping tubes formed with different predetermined primary resonance frequencies within the elongated structure so that vibration energy in the structure is efficiently transferred to the damping tubes. Elongated structures normally have a plurality of modal or resonance frequencies, and each damping tube having a predetermined primary resonant frequency is positioned at a zone of maximum structure deflection for the corresponding equivalent modal frequency of the structure.

Support means interconnect the damping tubes in end-to-end relationship so that oscillations of the elongated structure are transmitted to the end portions of the damping tubes. According to one variation of the invention the support means include rods which interconnect the adjacent damping tubes to provide a fixed support for the end portions of the damping tubes. The support means also include spacer elements which extend from an intermediate portion of the rods to form an abutting, contiguous contact with the inner surface of the structure. In another variation, flexible cable means interconnect the end portions of the damping tubes so that the end portions are disposed in contact with the inner surface of the structure, wherein the end portions of the damping tubes are rounded or otherwise configured to provide efficient transmission of vibration energy from the cylindrical structure to the damping tubes.

Preferably, the damping tubes comprise an elongated tubular shell, end plugs of a rigid material sealing the end portions of the tubular shell, and material filling the tubular shell which is selected from the group that includes elastomeric and viscoelastic materials, sand-like particles, and friction damping plates.

Accordingly, an object of the present invention is to provide a tuned damping means for suppressing and reducing fluid induced oscillations in elongated tubular structures.

It is another object to provide a damping means which is simple and inexpensive to construct while providing effective, efficient vibration damping in elongated structures.

It is a further object to provide a damping assembly which requires minimal maintenance and which does not require external connections of guy wires.

It is yet another object to provide a plurality of damping elements which can be tuned to dissipate a predetermined frequency range of structural vibrations and which effectively attenuates multidirectional oscillations of a cylindrical support structure.

DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

DESCRIPTION OF THE PREFERRED EMBODIMENT

Figure 1:
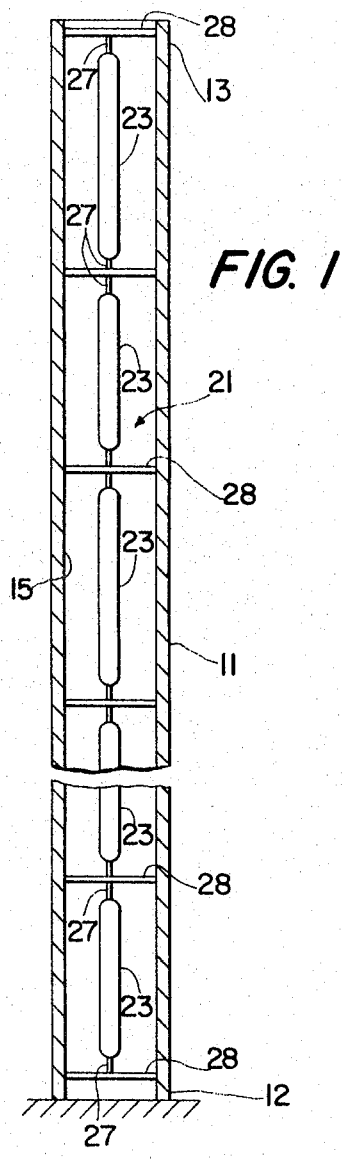
FIG. 1 is a side view of a vibration damping assembly supported within a sectioned tubular structure.

Referring to the drawings and more particularly to FIG. 1, there is generally shown a sectional view, of a elongated and generally cylindrical structure 11 such as a flagpole, lightpole, antenna or the like. Disposed within the cylindrical structure 11 is a damping assembly 21 for suppressing self-excited, wind-induced oscillations in such structures.

Figure 4:
FIG. 4 is a diagramatic view of periodic vortex shedding in two-dimensional fluid flow around a cylinder.
Figure 5A:
FIGS. 5a–c are simplified schematic views of the vibration modes of an elongated structure superimposed with the unstressed position of the elongated structure.
Figure 5B:
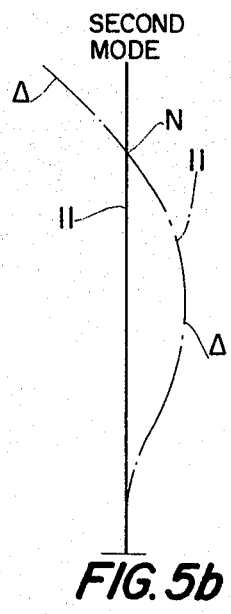
Figure 5C:
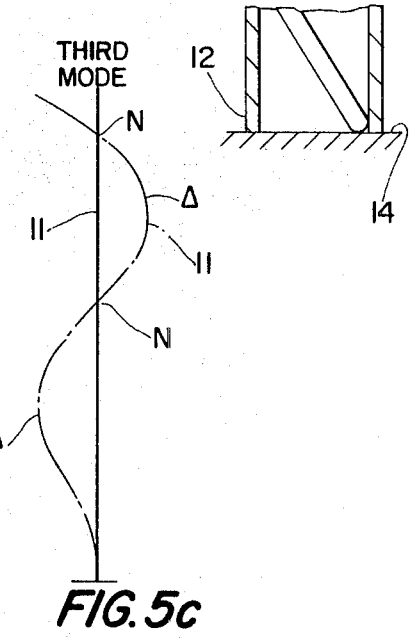

Cylindrical structures 11 of the aforementioned kind are normally fixed to a support structure at their base positions 12 and unsupported or partially supported at their free end portions 13. Such cylindrical structures 11, in addition to withstanding the deflections caused by the wind pressure in the plane of wind movement, also have to accommodate periodic forces produced by vortex shedding of the wind flow, as generally represented in FIG. 4. The forces produced by the vortex shedding of the wind flow cause the structure 11 to oscillate transverse to the wind direction and, for certain structures, such as those having cylindrical cross-sections as shown in FIG. 4, the eddying currents or vortex shedding assumes an alternating pattern with vortices shedding from one side of the cylinder and then from the other side of the cylinder. These oscillations can become self-excited when the frequency of the wind-induced oscillations matches or becomes substantially equivalent to one of the natural or resonant frequencies of the structure. For example, FIGS. 5a–c are representative of the first, second, and third modes of oscillation, wherein for the first or primary modal frequency, as shown in FIG. 5a, maximum deflection ($\Delta$) occurs at the free end portion of the cylindrical structure 11. For the second modal frequency, as shown in FIG. 5b, there are two zones of maximum structural deflection ($\Delta$) with a nodal point, as represented by letter N, extending therebetween. Similarly FIG. 5c is representative of the third modal frequency wherein three zones of maximum deflection and two nodal points (N) occur. It was found that efficient suppression of self-excited wind induced vibrations in structures of the aforementioned kind occurs when damping devices having predetermined primary resonance frequencies are positioned at locations on the cylindrical structure 11 where maximum deflection occurs at the corresponding resonance frequency of the structure 11. Thus, for example, in FIG. 5a a damping device having a primary resonance frequency equal to the first resonance frequency of the cylindrical structure 11 is preferably positioned at the zone of maximum deflection ($\Delta$) for the structure. Likewise, in FIG. 5b, damping devices having a primary resonance frequency equal to the second resonance frequency of the cylindrical structure are preferably positioned at the zones of maximum deflection ($\Delta$) for the structure 11.

Referring to the preferred embodiment shown in FIG. 1, the damping assembly 21 generally comprises a plurality of interconnected damping tubes 23 suspended within the interior of the cylindrical structure 11, wherein the damping tubes 23 have primary resonant frequencies equivalent to the self-excited resonant frequencies of the tubular structure 11. The damping assembly 21 further includes interconnecting means in the form of rods 27 for securing together the proximate end portions of adjacent damping tubes 23, and spacer means 28 attached to rods 27 and disposed in close proximity or abutting contiguous relationship with the inner surface 15 of the structure 11 for transmitting oscillations in the elongated structure 11 to the damping tubes 23. Preferably, the rods 27 are attached to the end portions of the adjacent damping tubes 23 so that unrestricted oscillation of the damping tubes 23 is permitted regardless of whether the structure is oriented in a vertical, horizontal or oblique position. The spacer means 28 are preferably of plate-like configuration which substantially conform to the interior of the structure 11 so that multi-directional oscillations of the structure are transmitted to the rods 27 and the damping tubes 23. However, the spacer element 28 should have a smaller diameter than the inside dimension of the structure 11 to facilitate insertion of the damping assembly 21 into the elongated structure 11. Both the rod 27 and spacer elements 28 are preferably formed of a stiff material such as metal or plastic so that a substantial portion of the oscillation energy is transmitted to the tuned damping tubes 23.

Figure 2:
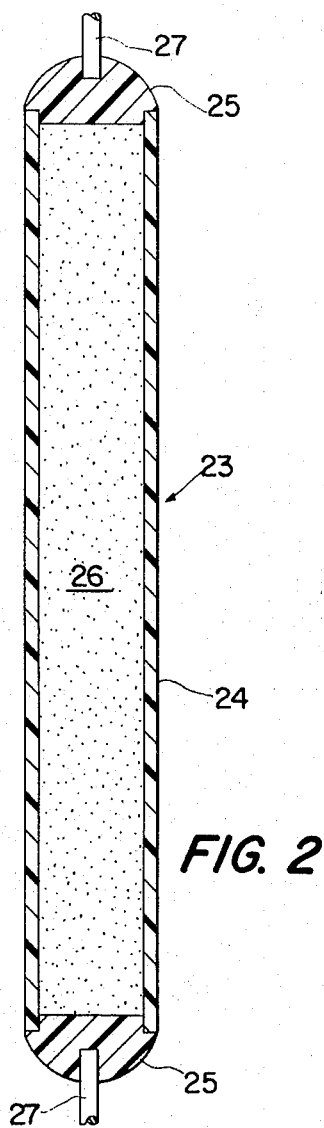
FIG. 2 is an enlarged view of a damping tube of FIG. 1.

As shown in FIG. 2, the damping tubes 23 preferably comprise an elongated shell 24 of, for example, a metallic or plastic material, plug elements 25 sealing the opposite end portions of the shells 24, and energy damping material 26 disposed within the elongated shells 24. As more specifically depicted in FIG. 2, the rods 27 are embedded in the plugs 25 to form a fixed, immovable joint therebetween so that the oscillation energy is transmitted initially to the plugs 25 and then to the elongated shells 24 and damping material 26. Examples of suitable damping mediums 26 include: elastomeric and viscoelastic composites; sand-like particles wherein energy is dissipated by relative movement of the particles; viscous damping by fluids; and damping plates which operate through differential movements of the plates. Damping tubes 23 can be constructed with different primary resonance frequencies by varying the length and stiffness of the shell 24 and/or the type of damping material 26.

Figure 3:
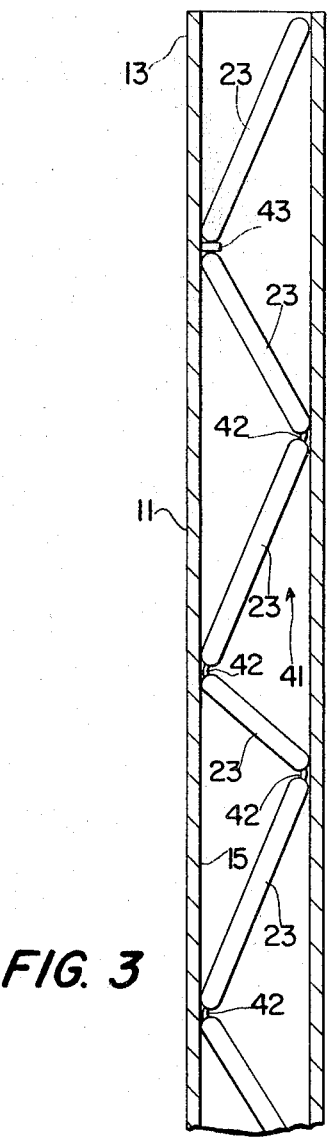
FIG. 3 is a side view of another vibration damping assembly supported within a sectioned tubular structure.

An alternate embodiment of the present invention is shown in FIG. 3, wherein the damping assembly 41 comprises a plurality of pivotally interconnected damping tubes 23 of the aforementioned kind which are supported within the cylindrical structure 11. When the alternative damping assembly 41 is inserted into the cylindrical structure 11 the end portions of the damping tubes 23 are randomly disposed in abutting contact with the inner surface 15 of the cylindrical structure 11 so that oscillations in the cylindrical structure 11 are transmitted directly to the damping tube 23. In operative position, the damping tubes 23 are arranged so that the longitudinal axis of the damping tubes 23 are disposed at varying oblique angles with the longitudinal axis of the cylindrical structure 11. The damping tubes 23 are provided with rounded or arcuate end portions 25, as shown in FIG. 2, to provide significant contact with the abutting surface 15 of the cylindrical structure 11. Flexible cables 42 are used to interconnect the damping tubes 23 and separation elements may be attached to the cables 42 to reduce and preclude damping interference between adjacent damping tubes 23.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A damping assembly for suppressing fluid flow induced vibrations in an elongated tubular structure which comprises:
   a plurality of vibration damping tubes of different predetermined primary resonant frequencies suspended within the structure wherein each damping tube includes an elongated tubular shell having opposite end portions, plug elements secured to said opposite end portions, and an energy damping material disposed within said tubular shell and confined therein by said plug elements; and
   means pivotally connecting the spaced end portions of adjacent damping tubes in end-to-end relationship so that said end portions of said damping tubes abut the inner surface of the structure.

2. The damping assembly according to claim 1, wherein:
   the structure has different modal resonant frequencies of oscillation with zones of maximum deflection defined for each of said resonant frequencies;
   said damping tubes have different primary resonant frequencies which are substantially equivalent to the resonant frequencies of the structure; and
   said damping tubes are suspended within the structure so that a tube having a predetermined primary resonant frequency is positioned at a zone of maximum structure deflection for the corresponding equivalent modal frequency of the structure.

3. The damping assembly according to claim 1, wherein:
   said damping tubes have different predetermined lengths so that said damping tubes have different primary resonant frequencies.

4. The damping assembly according to claim 1, wherein:
   said damping tubes have rounded end portions for providing an arcuate contact surface to abut the inner surface of the structure.

5. The damping assembly according to claim 1, wherein:
   said damping tubes are positioned within the structure so that the longitudinal axes of the tubes are oblique to the longitudinal axes of the structure.

6. The damping assembly according to claim 5, wherein:
   said end portions of said tubes have curved end portions for providing an arcuate contact surface to abut the inner surface of the structure.

7. The damping tube assembly according to claim 1, wherein:
   said tubular shell is formed of a stiff material, said plugs are formed of a generally non-deformable material and said energy damping material is selected from the group of viscoelastic, elastomeric, and viscous fluid damping materials.

8. A damping assembly for suppressing vibrations in an elongated structure that are induced by vortex shedding of fluid flow around the structure, which comprises:
   a plurality of damping tubes of different predetermined primary resonant frequencies suspended from the structure wherein each damping tube includes an elongated tubular shell having opposite end portions, plug elements sealing said opposite end portions wherein said plug elements have arcuate end portions for providing an arcuate contact surface to abut the surface of the structure, and vibration damping material disposed within the tubular shell; and
   means connecting the spaced end portions of adjacent damping tubes in end-to-end relationship so that said end portions of said damping tubes are disposed in abutting relationship with the structure and the longitudinal axes of said damping tubes are oblique to the longitudinal axis of the structure, wherein said elongated tubular structure has different modal resonant frequencies of vibration with zones of maximum deflection defined for each of said resonant frequencies, said damping tubes have different primary resonant frequencies of vibration which are substantially equivalent to the resonant frequencies of the structure, and said damping tubes are suspended within the structure so that a tube having a predetermined primary resonant frequency is positioned at a zone of maximum structure deflection for the corresponding equivalent modal frequency of the structure.

9. A damping tube assembly for suppressing fluid induced vibrations in an elongated tubular structure comprising:
   a plurality of damping tubes of different predetermined primary resonance frequency suspended within the structure wherein each damping tube includes an elongated tubular shell having opposite end portions, plug elements sealing said opposite end portions, and an energy damping material disposed within said tubular shell;

means interconnecting the adjacently disposed end portions of adjacent damping tubes so that said damping tubes are positioned in a substantially aligned position, said connecting means comprises rods extending between and fixed to the end portions of adjacent damping tubes so that said damping tubes are supported only at the end portions with free vibration of said damping tubes permitted therebetween; and spacer means connected to said connecting means and disposed in abutting, contiguous relationship with the inner surface of the structure for transmitting oscillations in the structure to said connecting means and said damping tubes.

10. The damping tube assembly according to claim 9, wherein:

said spacer means includes planar elements attached to the intermediate portions of said rods, and each said planar element extending substantially normal to the respective rod and adjacent damping tubes.

11. A damping tube assembly for suppressing fluid induced vibrations in an elongated tubular structure having different modal frequencies of oscillation with zones of maximum deflection defined for each of said resonant frequencies, comprising:

a plurality of damping tubes of different predetermined primary resonance frequencies which are substantially equivalent to the resonant modal frequencies of the structure, said tubes are suspended within the structure so that a damping tube having a predetermined primary resonant frequency is positioned at a zone of maximum structure deflection for the corresponding modal frequency of the cylindrical structure, and each damping tube includes an elongated tubular shell having opposite end portions, and plug elements sealing said opposite end portions, and an energy damping material disposed within said tubular shell;

means interconnecting the adjacently disposed end portions of adjacent damping tubes so that said damping tubes are positioned in a substantially aligned position; and spacer means connected to said connecting means and disposed in abutting, contiguous relationship with the inner surface of the structure for transmitting oscillations in the structure to said connecting means and said damping tubes.

* * * * *